Aug. 2, 1938.   S. TRIMBATH   2,125,526
POWER TRANSMISSION MECHANISM
Original Filed Dec. 1, 1932   5 Sheets-Sheet 1

Inventor
Samuel Trimbath

By Chester H. Braselton
Attorney

Aug. 2, 1938.    S. TRIMBATH    2,125,526
POWER TRANSMISSION MECHANISM
Original Filed Dec. 1, 1932    5 Sheets-Sheet 2
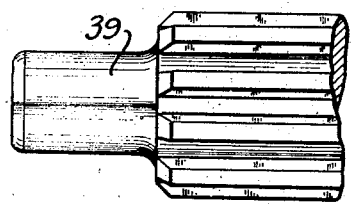
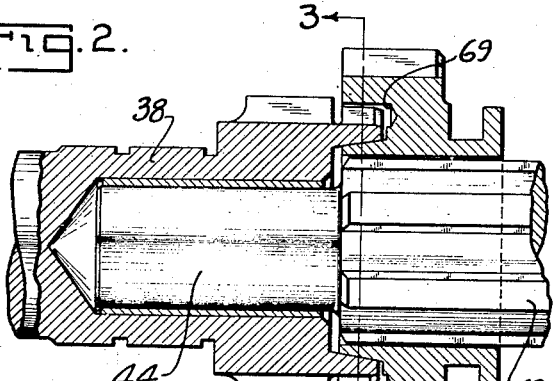
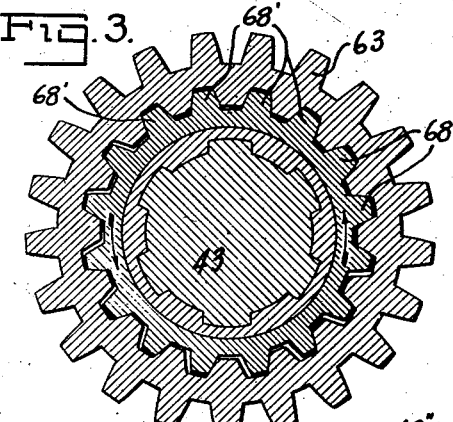
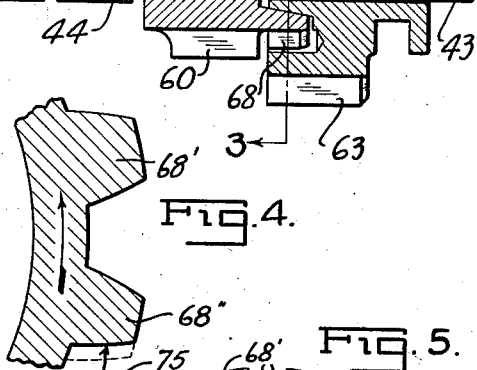
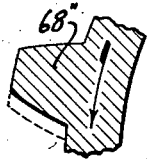
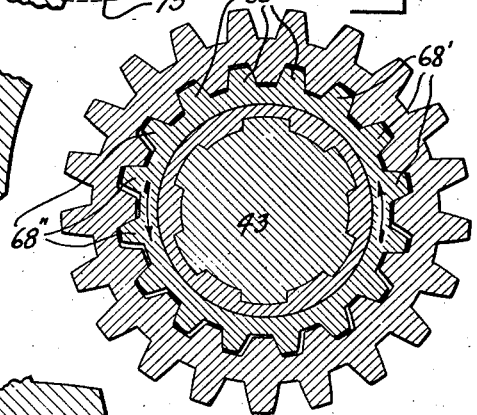
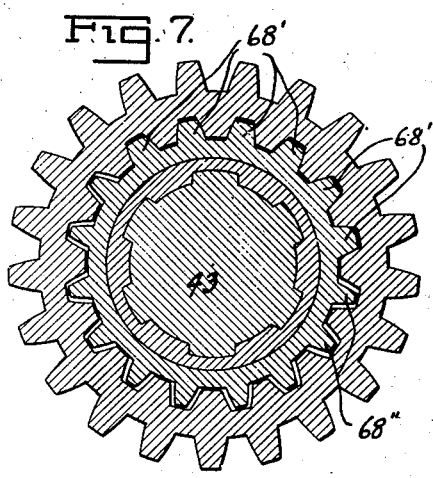
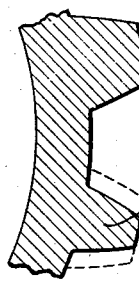
Inventor
Samuel Trimbath
By Chester H. Braselton
Attorney

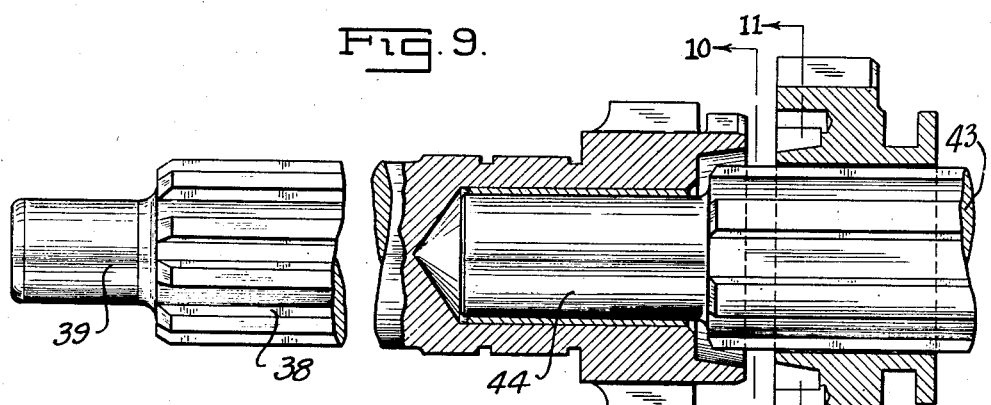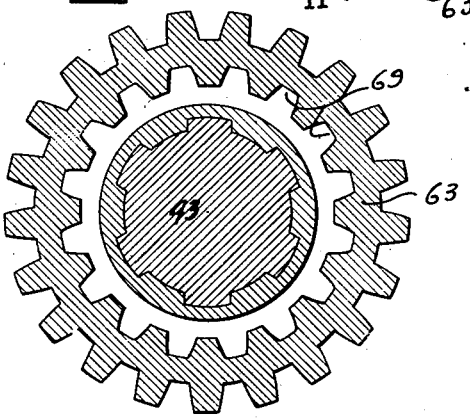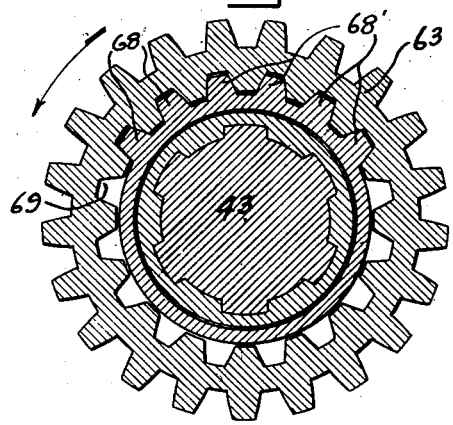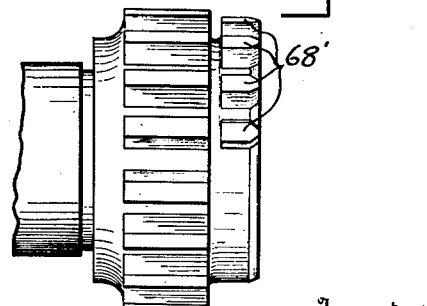

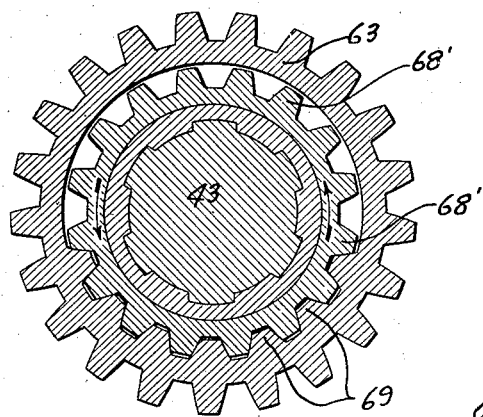
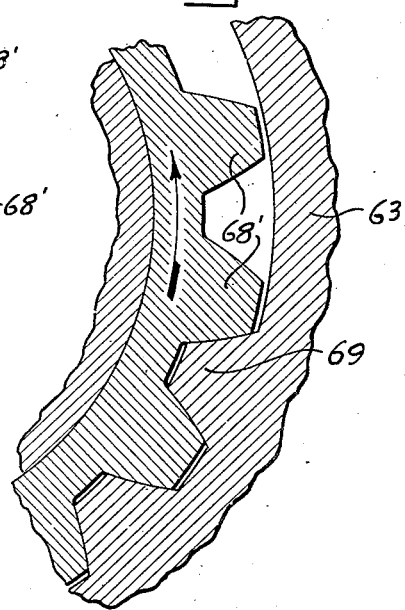
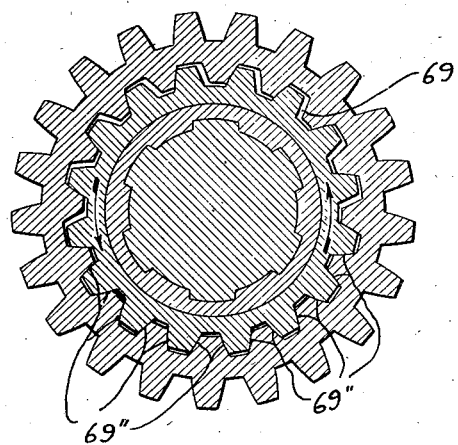
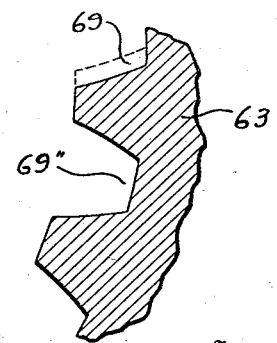

Aug. 2, 1938.      S. TRIMBATH      2,125,526
POWER TRANSMISSION MECHANISM
Original Filed Dec. 1, 1932      5 Sheets—Sheet 5
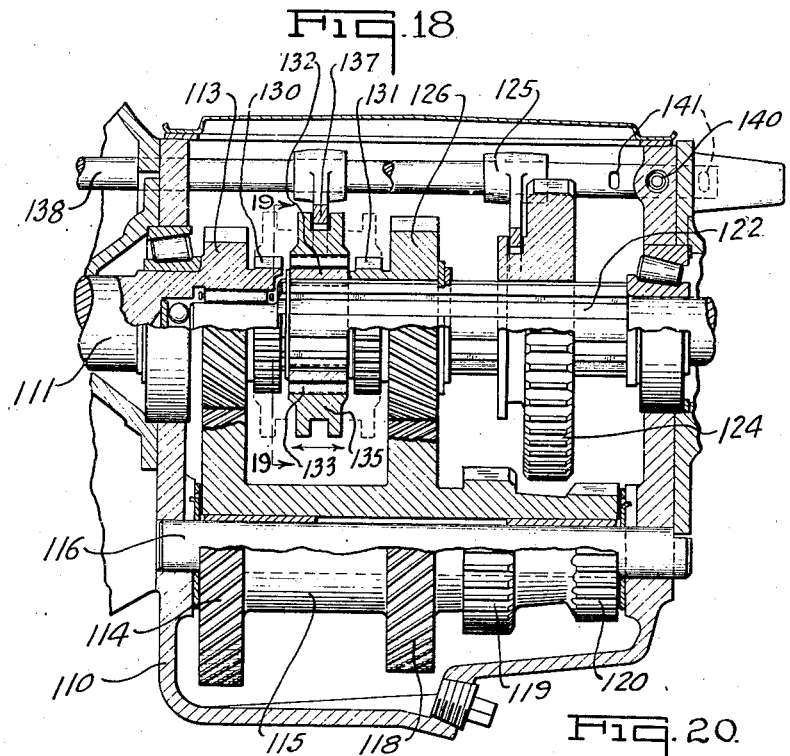
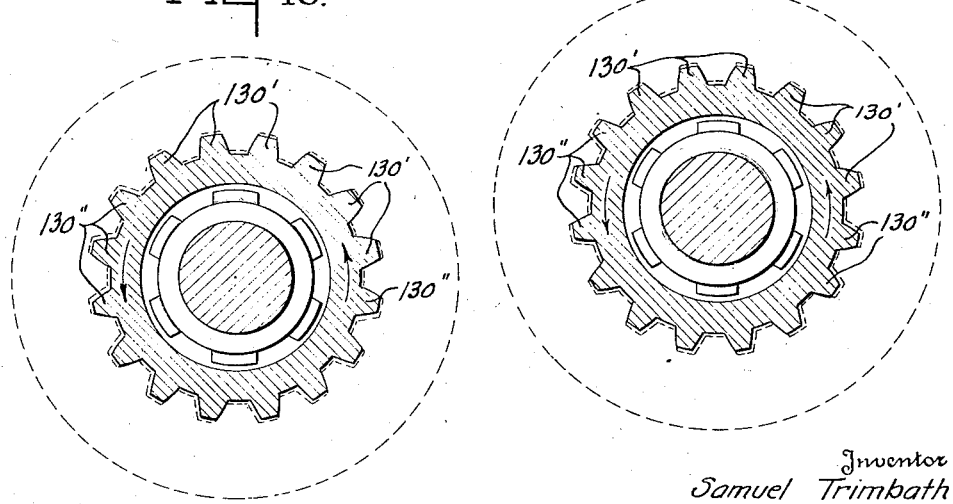
Inventor
Samuel Trimbath
By Chester K. Braselton
Attorney Patented Aug. 2, 1938

2,125,526

UNITED STATES PATENT OFFICE 2,125,526

POWER TRANSMISSION MECHANISM

Samuel Trimbath, Kalamazoo, Mich., assignor, by mesne assignments, to Willys-Overland Motors, Inc., a corporation of Delaware Application December 1, 1932, Serial No. 645,217
Renewed November 13, 1937

15 Claims. (Cl. 192—108)

This invention relates to power transmission mechanism and more particularly to transmission mechanism utilizing clutching means of the interengaging projection type for completing transmitting power from a prime mover to the driving connection as for example in drive wheels of an automotive vehicle.

In a power propelled vehicle of ordinary construction incorporating an internal combustion engine of the variable speed type as a prime mover, it is usual to interpose an arrangement of speed reduction gearing or a gear train prior to the final drive to the drive wheels of the vehicle as it has been found desirable at starting and at slow speeds to employ such a speed reduction by reason of the fact that the power developed by an internal combustion engine increases with the speed of the engine. Thus, to insure an effective driving torque in starting an automotive vehicle of this character and operating same at slow speeds or under heavy loads, a speed reduction gearing or gear set is usually employed to obtain sufficient power from the prime mover. It has been found that in prior constructions of gear sets in which various ratios of speed may be obtained between the prime mover and the final drive by the shiftable interenmeshment, engagement or disengagement of interlocking elements or members having interlocking portions or projections, that during the transmission of driving torque certain of these elements tend to become demeshed or disengaged. This tendency toward demeshment of elements under driving torque is particularly prevalent when a toothed member or clutching gear is enmeshed with a correspondingly toothed or recessed element in an arrangement wherein one or both of the elements are capable of being shifted to an interlocking position or to a disengaged position. Among the various reasons given for this apparent mechanical imperfection is attributed to a required clearance to effect a relative shifting or sliding of one or both of the toothed or recessed elements to engaged or disengaged position. This clearance is sufficient in some cases when the parts are engaged under driving stress or torque to result in an oscillating action of one element with respect to the other in a plane substantially at right angles to the axes of the interengaging elements, which oscillating action under the influence of the friction of the interengaging teeth and the walls of corresponding recesses tends to cause a disengagement of the elements. Another reason tending to cause disengagement of the clutching elements under load is attributed to a lack of parallelism between corresponding pitch lines of the clutching teeth or projections which may arise by reason of irregularities in manufacturing or distortion during heating treatment of the parts. The looseness or clearance allowed between the support and the shiftable element will cause alternate, diametrical, frictional stresses tending to disengage the elements so as to cause a linear "creeping" of the movable element which "creeping" is particularly aggravated by periodic acceleration and deceleration of the prime mover.

This undesirable condition may also arise by reason of misalignment of the shafts or supports carrying the respective inter-enmeshable clutching elements which may be caused by irregularities in manufacturing even if the shiftable element is properly aligned with its supporting shaft. The inter-enmeshable elements would under this situation tend to "creep" linearly as the axes of the shafts supporting these elements, if out of alignment, would rotate with a slight angularity one with respect to the other, the same being true with respect to the inter-enmeshable elements carried thereby which under the friction stress existing between the interlocking portions of such elements would result in a tendency of separating these elements under stress or load, as they are bound to move in a direction of least resistance in event there is a longitudinal stress set up as hereinbefore explained. This condition produces at or substantially at the pitch line or normal engaging point of the inter-engaging clutching projections a theoretical spiral wind of the points on the line of engagement of the teeth of these elements.

The condition hereinbefore explained is generally present in the usual transmission or gear set incorporating shiftable or sliding enmeshable toothed members for obtaining various speed ratios and is particularly characteristic of the type of gear train for the transmission of power wherein certain gears thereof are in constant mesh while a separate shiftable element is employed as a means of changing the speed ratio in certain types through the use of synchronizing cones or other means for bringing the driving and driven elements substantially to the same speed before the interenmeshment of drive connection. The difficulties heretofore explained are present in a constant mesh gear transmission and are more aggravated as the driven gears are generally of helical type so that there is a lateral thrust imparted to the driven gear and as the latter is usually slidably supported upon a shaft or other support, that because of such lateral thrust, the driven helical gear tends to tilt thus causing a slight misalignment of the gear and the shiftable means for establishing a drive connection therewith, such arrangement accentuating the tendency of the shiftable element to linearly or axially "creep" out of driving engagement.

As one of the objects, this invention embraces an arrangement of power transmission mechanism wherein the tendency of relatively shiftable interengaging elements to become disengaged is substantially eliminated.

The invention contemplates the provision of simple and effective means for establishing a drive between driving and driven elements wherein satisfactory transmission of power may be obtained and wherein the tendency of the shiftable element to become disengaged is substantially eliminated without the use of additional means.

A further object of the invention is the provision of improved clutching means for use in a power transmission arrangement wherein a satisfactory drive for the transmission of power is obtained and the weight of certain of the elements reduced.

Still a further object of the invention is the provision of a gear train incorporating shiftable elements for obtaining various speed ratios between the driving and driven elements which is inexpensive to manufacture.

The invention also embraces a method of producing certain of the elements forming a part of the present invention.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 2 is an enlarged view showing certain elements in interengaged or driving relationship of the arrangement illustrated in Figure 1 showing one form of the invention;

Figure 3 is a vertical sectional view taken substantially on the line 3—3 of Figure 2 showing one arrangement of interlocking projections of the clutching elements;

Figure 4 is an enlarged view of a portion of one of the toothed elements of the arrangement shown in Figure 3 illustrating the reduction in size of certain teeth or driving projections thereof;

Figure 5 is a view similar to Figure 3 showing another arrangement of the driving or clutching projections of certain of the elements of transmission mechanism;

Figure 6 is an enlarged view showing one of the toothed or driving projections of one of the elements illustrated in Figure 5 showing the method of reducing the size of certain teeth or driving projections;

Figure 7 is a view similar to Figure 3 showing another modified arrangement of clutching elements;

Figure 8 is an enlarged fragmentary view showing a portion of one of the elements of Figure 8 illustrating in detail the configuration of certain of the clutching teeth of the arrangement shown in Figure 7;

Figure 9 is a view similar to Figure 2 showing a modified form of the invention with the clutching elements in disengaged position;

Figure 10 is a vertical sectional view taken substantially on the line 10—10 of Figure 9;

Figure 11 is a vertical sectional view taken substantially on a line 11—11 of Figure 9;

Figure 12 is a view showing one of the clutching elements of the arrangement shown in Figure 9;

Figure 13 is a vertical transverse sectional view showing the driving and driven elements of the form of the invention shown in Figure 9 in interengaged or driving relationship;

Figure 14 is a view similar to Figure 13 showing a modified arrangement wherein certain of the clutch projections are removed from the driven member;

Figure 15 is an enlarged fragmentary detailed view showing the clutching arrangement illustrated in Figure 14;

Figure 16 is a view similar to Figure 3 with certain recesses of the driven member enlarged in a modified form of clutching arrangement;

Figure 17 is a fragmentary detail view showing a portion of one of the elements illustrated in Figure 16 showing the enlarged recesses;

Figure 18 is a view similar in part to Figure 1 showing another arrangement of power transmission mechanism or gear train incorporating the arrangement of my invention;

Figure 19 is an enlarged detailed sectional view taken substantially on the line 19—19 of Figure 18 showing inter-enmeshment of certain driving and driven elements incorporating my invention;

Figure 20 is a view similar to Figure 19 illustrating the interengagement or inter-enmeshment of driving and driven elements incorporating another form of my invention.

Figure 1:
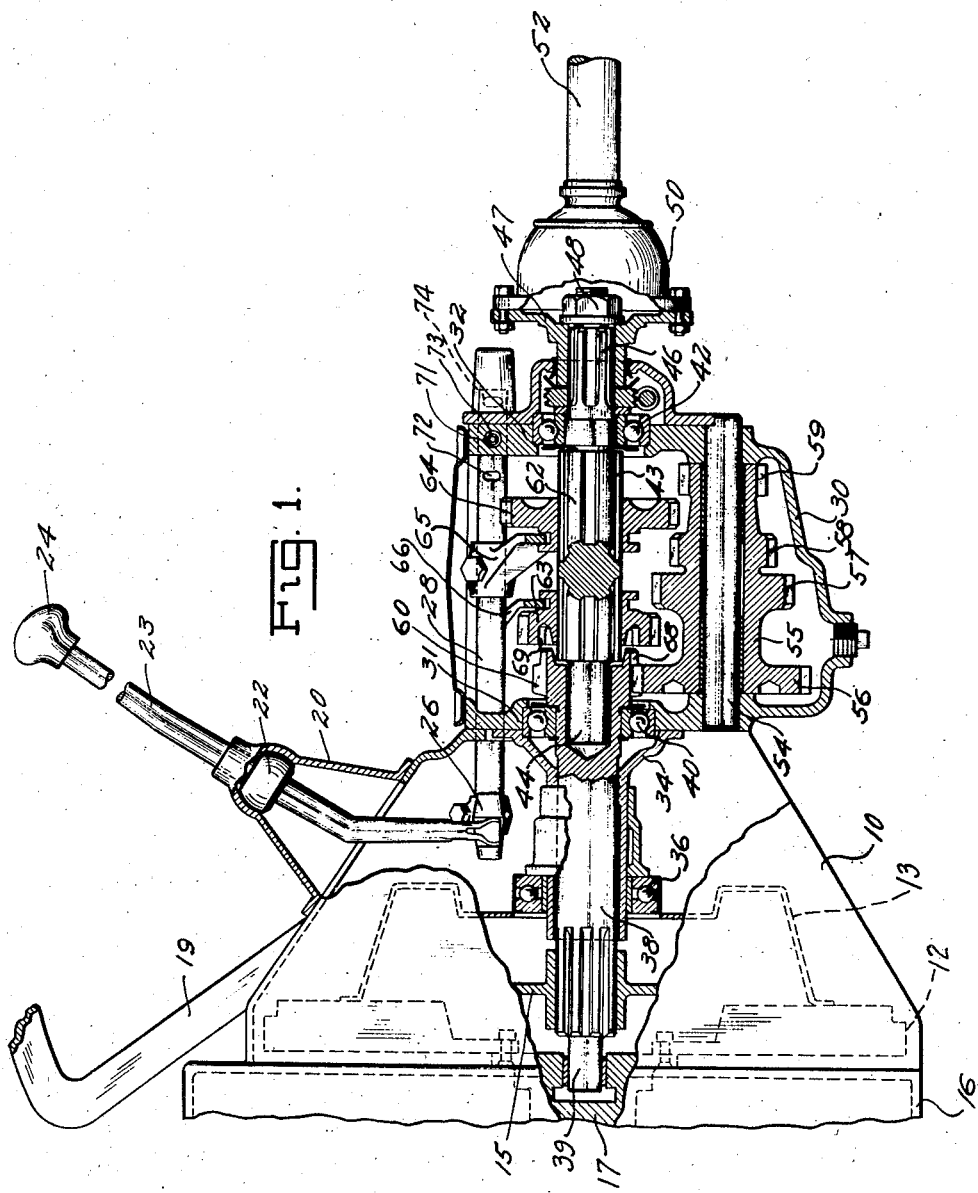
Figure 1 is a vertical sectional view through a variable speed gear train or transmission mechanism incorporating one arrangement of my invention.

I have shown the arrangement of my invention as incorporated in and having particular use with a gear set or system of gearing for transmitting power from an internal combustion engine of the variable speed type to the drive wheels of an automotive vehicle in which for satisfactory operation it is desirable to employ means to have a different ratio of speed between the engine and the drive wheels under certain conditions, but it is to be understood that the arrangement of my invention may be used in any power transmission system where two or more driving or driven elements are incorporated having operative drive or clutch connection therebetween, and that I contemplate the arrangement and utilization of my invention in any power transmission system or in any place where it is desired to secure satisfactory drive connection between mechanical elements.

Referring to the drawings in detail and particularly Figures 1 to 4, inclusive, I have illustrated a power transmission mechanism, gear train or gear set of a type particularly usable in obtaining variable speed ratios between an internal combustion engine and drive shaft or drive wheels of an automotive vehicle wherein numeral 10 illustrates a housing enclosing the fly wheel 12 and a revoluble clutch housing 13 enclosing friction clutch mechanism only a portion of the driven disc being illustrated as at 15. 16 illustrates a portion of the engine casing, 17 the extremity of the engine crank shaft or other portion of a power unit or prime mover. 19 illustrates one of the usual operating control pedals of the vehicle, 20 an upright casing secured to the casing 10 in which is pivoted by means of a ball joint 22 a shifting lever 23 having manipulating handle portion 24, the lower end of the rod 23 being connected by means of yokes 26 to longitudinally movable or slidable rods, only one of which is shown in Figure 1 as at 28 which performs the function of meshing and demeshing certain gears in a manner to be hereinafter explained.

Positioned immediately at the rear of the casing 10 is a housing 30 having end walls 31 and 32. Fixed to the forward portion of the wall 31 of the casing 30 is a sleeved bracket 34 carrying a thrust bearing 36 for the clutch mechanism. Positioned within a central bore in the bracket 34 is a shaft 38 provided at its forward end with a tenon 39 journalled within a bore in the end of the engine crank shaft 17, the other end being journalled in an anti-friction bearing 40 mounted in an opening in the wall 31 in the casing 30. Positioned within an opening in the rear wall 32 of housing 30 is an anti-friction bearing 42 in which is journalled a shaft 43, the latter having at its forward end a tenon 44 journalled within an internal axial bore in the end of shaft 38. The shaft 43 is provided with a splined portion 46 which extends rearwardly of the housing 30 and upon which is fixedly mounted a bracket 47 and held in place by means of a nut 48 threaded upon an extension of the shaft 43. The bracket 47 is connected to a member 50 which forms the exterior housing of a universal joint mechanism enclosed therein (not shown) which in turn is connected to a drive or propeller shaft 52 which is connected by means (not shown) to propel the vehicle through its connection to the drive wheels.

Positioned out of alignment with shaft 43 but parallel therewith is an auxiliary shaft 54 upon which is journalled a member 55 formed with four gear or toothed portions 56, 57, 58 and 59, the gear 56 being in constant mesh with a gear or toothed portion 60 formed upon a portion of shaft 38 projecting within the transmission casing 30. Shaft 43 is provided with a splined portion 62 upon which is slidably mounted gears 63 and 64, these gears having means or feathers projecting into the splines so that rotary movement of either of the gears transmits rotation to shaft 43. Gear 64 which is the low speed gear is connected by means of a yoke 65 to the longitudinally movable shaft 28 providing the means for sliding gear 64 for purpose to be hereinafter explained. As has been previously stated, parallel with shaft 28 is a second shaft similar thereto having a yoke 66 similar to 65 which engages a circumferential groove in gear 63 in the same manner as the yoke 65 engages a circumferential groove in gear 64 for shifting gear 63.

The end of shaft 38 is also provided with a second toothed section or gear 68, and gear 63 is also provided with an internal toothed portion or gear 69 for establishing driving connection as hereinafter explained.

The operation of the mechanism above described is as follows: Shaft 38 is driven by the internal combustion engine or prime mover (not shown) through the friction clutch mechanism 15 causing rotation of gear portions 60 and 68. Gear 60 being constantly in mesh with gear 56 causes constant rotation of member 55 whenever the shaft 38 is rotated. In order to bring the slow speed gear into operation to effect a driving connection to the propeller shaft 52, lever 23 is moved to the proper position to slide shaft 28 and yoke 65 longitudinally to the left to move the comparatively large gear 64 into mesh with gear 58 thus establishing a drive between shafts 38 and 52, whereby shaft 52 is rotated at a reduced speed as compared with rotation of shaft 38. When it is desired to effect a higher speed of shaft 52 with respect to shaft 38, the lever 23 is moved to a different position moving shaft 28 and gear 64 to the position illustrated in Figure 1 demeshing gears 64 and 58, further movement of the lever 23 actuating the shaft carrying yoke 66 to move gear 63 into mesh with gear 57. As gear 57 is larger in diameter than gear 58 and gear 63 smaller in diameter than gear 64, a correspondingly higher speed as compared with shaft 38 is imparted to drive shaft 52.

In order to secure a direct drive, i. e., shaft 38 connected directly with shaft 52 so that both shafts are rotating at the same speed, lever 23 is moved in the opposite direction bringing gear 63 out of enmeshment with gear 57, and the internal teeth 69 of the gear portion 63 into enmeshment with the teeth 68 of the shaft 38 thus establishing a direct drive between shafts 38, 43 and 52. The gear portions 68 and 69 are commonly known in the art as clutching gears.

As has been previously explained, gear 63 is slidable upon shaft 43 and therefore there exists between the internal bore of this gear and the periphery of shaft 43 sufficient clearance to permit the sliding of the gear. When, however, the clutching gears 68 and 69 are in driving connection and are under load in torque transmitting relation the clearance between gear 63 and its supporting shaft in certain instances permits the gear 63 to tilt slightly, and it has been found that periodic acceleration and deceleration of the engine effects the tilting tendency of this gear and as the latter is under the stress of transmitting torque or force to the drive wheels it tends to follow the course of least resistance which is toward an out-of-mesh position. The tilting of the gear 63 with respect to its supporting shaft produces an out-of-parallel condition of the pitched lines of the toothed gear portions 68 and 69 and under load transmitting conditions results in a so-called spiral winding of one gear portion with respect to the other whereby the gear 63 will tend to move longitudinally or "creep" so as to demesh the clutching gear portions 68 and 69.

Means have been used for holding shaft 28 in certain of gear meshing positions in the form of a ball detent (not illustrated) mounted in a bore 71 under tension of a coil spring 73 which engages, in the several gear meshing positions, with recesses 72 and 74 in shaft 28 and tends to hold the shaft 28 in its shifted position. The other sliding shaft (not shown) arranged parallel with shaft 28 is also provided with recesses corresponding to recesses 72 and 74 and cooperate with a similar ball detent (not shown) tending to hold this shaft in its various positions. This means of retaining the sliding shafts in various positions however, has several disadvantages, in that if the spring pressure against the ball detent which is mounted in the bore 71 is of sufficient pressure to maintain shaft 28 in its various positions to prevent demeshment of the clutching gears as above explained, it becomes practically impossible to move lever 23 to effect a re-adjusting or shifting of shaft 28 to another of its positions. If the spring pressure on the ball detent is weakened or reduced to facilitate movement of the gear shifting lever 23, then the driving stress acting through the clutching gears particularly accentuated by reason of a periodic acceleration and deceleration of the engine and the resultant variation in the drive torque transmitted through the clutching gears results in the shiftable clutching gear 69 "creeping" out of meshment with its corresponding driving clutching element 68.

Referring particularly to Figures 2 through 4, inclusive, the same illustrate a means of my invention for alleviating or substantially overcoming these difficulties. In this form of the invention certain teeth of the clutching gear 68 are of the standard size and pitch, these teeth being designated as 68' particularly illustrated in Figure 3, there being in the embodiment illustrated six teeth of the standard contour in which each tooth snugly and properly engages the walls of the corresponding properly formed teeth of the internally toothed portion 69 of the driven clutching gear. The balance of the number of teeth upon the periphery of the driving clutching gear or member 68 are relieved on one side, i. e., reduced in size, these relieved or reduced teeth being designated 68", the relieved tooth being particularly indicated in full lines in Figure 4 by numeral 75 as compared with the standard formed tooth illustrated in this figure in dotted lines. The relieving of certain teeth in the driving clutching gear 68 in the embodiment shown is on the non-drive side or coasting side as indicated by the drive rotation direction arrows in Figure 3. It is well known that in any system of gearing there is present slight clearance between the teeth which is commonly termed as "back-lash", and therefore it follows that in this embodiment there is slight "back-lash" existing between the drive surfaces of teeth 68' and 69', thus there is always substantial peripheral tooth contact between the drive surfaces of both sets of teeth 68' and 68" and the driven side or face of each internal projection or tooth 69 of the clutching gear which are in close contact when driving torque is being transmitted through the member 68 to member 69. In event the engine is decelerated, there is a slight "play" between the two clutching members due to the "back-lash" or tooth clearance above mentioned, but by reason of the relieving of the major number of teeth 68" of the driving clutching member 68 actual contact between members 68 and 69 takes place only through the teeth 68', which are of the standard or proper configuration and the drive side of teeth 68", there being a freedom or clearance of the balance of the projections 68" on the non-drive side with the internal teeth 69 of member 63 so that any diametrical tendency to tilt member 63 with respect to member 68 has been substantially eliminated. When the motor is again accelerated, the clearance between member 63 and shaft 43 will be taken up by reason of the driving torque being transmitted only through teeth or projections 68' and the drive side of teeth 68" in mesh with corresponding teeth 69 in the member 63 and a tilting, if any, of the gear taking place upon such acceleration will not produce a spiral wind tending to demesh the clutching gears; and all tendency for the clutching members to become demeshed by reason of driving or torque transmitting stresses will be substantially eliminated.

Another form of the invention is illustrated in Figures 5 and 6 wherein teeth 68' of the driving clutching member are of the standard contour while the balance of the teeth 68" of this member have been relieved in much the same manner as heretofore described in connection with the form illustrated in Figures 3 and 4, but the relieving of certain teeth 68" is applied to the driving sides or walls of the major portion of the teeth in the member 68 which accomplishes substantially the same results as the relieving of the major portion of the teeth on the non-driving side as the "spiral wind" tending to demesh the clutching gears is substantially eliminated.

Figures 7 and 8 illustrate a further form of the invention wherein the teeth 68' are of the standard shape and configuration while the major portion of the teeth or the balance of teeth 68" on the clutching member 68 have been relieved or reduced in size on both the drive and the non-drive sides as particularly shown in detail in Figure 8. In this manner the entire driving contact of the interengaging clutch surfaces in either direction is through the minor number of teeth 68' on the member 68, the major number of teeth 68" which are of reduced size serving no driving function whatever but are preferably present upon the periphery of member 68 so that at high speeds the clutching gear will be substantially in balance.

It is to be noted that in the above described forms of the invention the relief given to certain teeth may be very little as for example only a few thousandths of an inch for sufficient clearance which should preferably exceed the amount of "back-lash" clearance existing between the theoretically perfectly meshed teeth forming the actual driving surfaces between the clutching gears.

In the arrangement shown in Figures 9 through 13, inclusive, the member 68 is provided with teeth throughout only a minor portion of its periphery which teeth are indicated at 68' and are of the standard configuration so that the entire driving torque takes place between teeth 68' and internal teeth 69 of gear 63. The operation of this form of the invention and the results obtained are substantially the same shown in the embodiments of Figures 2 to 8 of the drawings so far as the elimination of "creeping" or tendency of disengagement of the gears or members is concerned. The member 68, however, has been reduced in weight by reason of the elimination of the major portion of the teeth from the periphery thereof which also effects a reduction in the cost of producing the construction.

Figures 14 and 15 illustrate a further form of the invention wherein the female clutching gear teeth 69 of member 63 extend only throughout a minor portion of the internal surface thereof. In this form of the invention the teeth 68' of the male clutching gear 68 are of standard formation. The tendency of these clutching gears to become demeshed under load is obviated as the continuity of the "spiral wind" under the frictional stresses tending to separate the gears is substantially eliminated as the effective torque driving surfaces exist only on a minor portion of the periphery of the clutching gears.

The form of the invention illustrated in Figures 16 and 17 is similar to the form of the invention shown in Figures 3 and 4 except that in this form a major number of the recesses in the female clutch gear 69 are enlarged or relieved on one side preferably the non-drive side of the interengaging clutching projections, while the recesses shown in 69" are of the standard formation to properly fit the contour of the standard formed teeth 68 of the male clutching gear. In this form of the invention the axial stresses tending to demesh the elements are obviated as has been previously explained in connection with other forms of the invention.

The arrangement of my invention has particular utility in transmissions of the so-called constant mesh type wherein certain speed ratio gears of the gear set are in constant mesh, a drive being attained by shifting a toothed clutch member into engagement with toothed members cooperating with the gears to obtain various speeds of final drive.

Figure 18 illustrates one form of this type of transmission comprising a housing 110 in the forward end of which is journalled a shaft 111 having formed thereon a gear portion 113. The shaft 111 corresponds to shaft 38 illustrated in Figure 1 and is adapted to be driven from the crankshaft of an internal combustion engine. Meshing with gear 113 is a gear 114 formed upon a sleeve-like member 115 journalled upon an auxiliary or counter shaft 116, the member 115 being formed with other gear portions 118, 119 and 120.

Positioned in axial alignment with shaft 111 is a splined shaft 122 one end journalled in bearings at the rear of the housing 110, its forward end being journalled within a bore contained within the extremity of shaft 111. Slidably mounted upon splined portion of shaft 122 is a slow speed gear 124 which cooperates with a shifting yoke 125 adapted to be shifted by mechanism similar to that shown in the transmission mechanism of Figure 1 hereinbefore described. The gear 124 has feather portions extending into the splines of shaft 122 so that when the gear 124 is moved into enmeshed position with gear 119, a low speed is imparted to shaft 122 as compared with the speed of shaft 111.

Journalled for rotation upon shaft 122 is a gear 126 which is constantly in mesh with gear 118 formed upon the member 115. It is to be noted that gears 113, 114, 118 and 126 are preferably of helical tooth formation as this type of gearing is more silent in operation than the usual type of spur gearing.

The shaft 111 is provided at its forward end with a tooth clutching gear portion 130 and the gear 126 is formed with a similar toothed portion forming a clutching gear 131. Positioned between the non-slidable clutching gears 130 and 131 is a member 132 splined upon shaft 122 and adapted to rotate therewith being non-slidably mounted thereon. The exterior periphery of the member 132 is preferably formed with spur teeth 133 which enmesh with correspondingly shaped spur teeth formed in a longitudinally shiftable clutching gear 135, the latter having on its exterior periphery a circumferential groove into which extends a shifting yoke 137 mounted upon a shifting rod 138 connected with the shifting lever (not shown) in the same manner as rod 28 of Figure 1 is connected to the shifting lever 33, thus movement of the shifting lever in either direction operates to slide the member 135 into enmeshment with either of the non-slidable clutching gears 130 and 131.

It is to be noted that gear 126 is at all times rotating at a certain predetermined speed with respect to rotation of shaft 111, and when it is desired to connect the shaft 122 through the gear train to secure a so-called intermediate or second speed it is only necessary to move the shifting rod 138 to the right, yoke 137 carrying the shiftable member 135 into toothed or clutching engagement with the clutching gear 131, a portion of the teeth of member 135 being still in engagement with teeth 133, thus effecting a drive through gear 126, teeth 131, clutching member 135, teeth 133 to a final drive of shaft 122.

When it is desired to obtain a direct drive, that is a direct drive connection between drive shafts 111 and 122, it is only necessary to shift rod 138 to the left bringing the teeth of member 135 into engagement with the teeth 130 formed on the end of shaft 111, thus a direct drive is established through shaft 111, teeth 130, member 135, teeth 133 to shaft 122.

Due to the clearance required for adequate sliding movement of member 135 and the clearance necessary for rotation of gear 126, I have embodied one form of the arrangement of my invention as illustrated particularly in Figure 19, wherein teeth 130' are of standard configuration while the major number of teeth 130'' are of reduced size on the non-drive side to eliminate the so-called "spiral wind" or the tendency of the shiftable member 135 to "creep" longitudinally out of engagement with the clutching gear or toothed member 130. It is to be understood that teeth of clutching gear 131 connected to the constantly driven second speed gear are shaped correspondingly to the teeth 130 so that no "creeping" tendency will be set up tending to move 135 out of engagement with the clutching gear 131 as hereinbefore described in connection with clutching gear 130.

Another form of the invention as applied to this type of transmission is illustrated in Figure 20 wherein teeth 130' are of standard configuration, the remaining teeth 130'' in member 132 being of reduced configuration on the drive side which accomplishes substantially the same result of preventing tendency of the clutching gears to become separated in driving connection as the so-called "spiral wind" is eliminated.

The arrangement of my invention has particular utility in this form of constant mesh transmission, as has been previously stated, the required clearance to permit rotation of gear 126 and the sliding movement of shiftable clutch member 135 permits these members in some instances to tilt in respect to their supporting elements and in respect to each other. This tilting would normally produce the "spiral wind" or "creeping" action should the teeth be of standard configuration throughout their peripheries. With the incorporation of the arrangement of my invention providing the drive surfaces throughout only a portion of the circumferential contacting areas of said clutching gears, the tendency for these members to become disengaged under torque transmission is practically eliminated. Thus it is possible to employ only a weak spring 140 to hold a ball detent (not shown) into engagement with recesses 141 in the shiftable rod 138 for retaining the shiftable clutch member 135 in its various positions. The use of a weak spring 140 makes possible a change of speed ratio with very little effort being applied to engage and disengage the clutching gears.

What I claim is:

1. In a device of the character disclosed, in combination, power transmission mechanism including aligned slidable interengageable elements; said elements being movable into and out of engagement, said elements being provided with a series of interlocking projections; certain of said projections being of a thickness whereby driving engagement is effected throughout only a portion of the peripheries of said elements.

2. In a device of the character disclosed, in combination, power transmission mechanism including slidable interengageable elements; means for moving said elements into and out of engagement, said elements having a plurality of interlocking teeth, certain of said teeth being formed whereby power transmitting engagement is established throughout only a circumferential portion of said elements on one side of a plane passing through the axis of said elements.

3. In a device of the character disclosed, in combination, power transmission mechanism including slidably enmeshable toothed elements; means for moving one of said elements into and out of engagement with another of said elements, certain of the teeth of one of said elements being of reduced thickness whereby power is transmitted through only the teeth of normal size.

4. In a device of the character disclosed, in combination, power transmission mechanism including enmeshable gears; means for moving one of said gears into and out of engagement with another of said gears, certain of the teeth of one of said gears being of reduced thickness whereby power is transmitted through only the teeth of normal size.

5. In a device of the character disclosed, the combination of power transmission mechanism including substantially axially aligned interengageable clutching gears; means for moving one of said clutching gears into and out of engagement with another of said gears, said clutching gears being provided with interengaging projections and recesses enmeshable throughout only a portion circumferentially of said gears on one side of a plane passing through the axis of said clutching gears.

6. In a device of the character disclosed, the combination of power transmission mechanism including substantially axially aligned interengageable clutching gears; said clutching gears being movable into and out of engagement; one of said gears being provided with a plurality of uniformly shaped recesses, the other of said gears being provided throughout a portion of its periphery with toothed projections adapted to fit the walls of certain of said recesses and throughout the remainder of its periphery with toothed projections adapted to engage only one wall of each of the remaining recesses in said first mentioned clutching gear.

7. In a device of the character disclosed, the combination of power transmission mechanism including substantially axially aligned interengageable clutching gears; said clutching gears being movable into and out of engagement; one of said gears being provided with a plurality of spaced and uniformly shaped recesses, the other of said gears being provided throughout a portion of its periphery with toothed projections adapted to fit the walls of certain of said recesses and throughout the remainder of its periphery with toothed projections out of engagement with the walls of the remaining recesses in said first mentioned clutching gear.

8. In a device of the character described power transmitting mechanism including a pair of rotatable clutching elements arranged for relative slidable interengagement and disengagement; each of said elements having a plurality of interengageable projections arranged for effective transmission of power stresses in both directions of rotation through only a portion peripherally of said clutch elements on one side of a plane passing through the axis of said clutching elements.

9. In a device of the character disclosed, the combination of a power transmission mechanism including substantially axially aligned interengageable clutching elements, said elements being provided with interlocking projections, certain of said projections formed with reduced peripheral thickness whereby a clutching driving engagement is effected through the engagement of projections of unreduced peripheral thickness.

10. In a device of the character described, power transmitting mechanism including a pair of rotatable clutching elements arranged for relative slidable interengagement and disengagement; each of said elements having a plurality of interengageable projections arranged for effective transmission of power stresses in both directions of rotation, the shape of said projections having areas so that contacting engagement is effected throughout only a portion of the peripheries of said clutching elements on one side of a plane passing through the axis of rotation of said clutching elements.

11. In a device of the character described, in combination, a pair of rotatable clutching elements aligned for relative slidable interengagement and disengagement; each of said elements having a plurality of interengageable spaced projections arranged for effective transmission of power stresses in both directions of rotation, the shape of certain of the spaced projections of one element having areas which fit the spaces between the projections of the other element so that full contacting engagement is effected throughout only a portion of the peripheries of said clutching elements on one side of a plane passing through the axis of rotation of said clutching elements.

12. In a device of the character disclosed in combination, a plurality of aligned slidable interengageable elements; means associated with said elements for moving the same into and out of engagement, said elements being provided with a series of interlocking spaced projections for effective transmission of power in both directions of rotation, the projections of one of said elements being of a thickness with respect to the spaces between the projections of the other element so that full contact of said projections for driving rotative stresses in either direction is effected throughout only a portion of the peripheries of said elements.

13. In a device of the character disclosed in combination, power transmission mechanism including aligned slidable interengageable gears; means associated with said gears for moving the same into and out of engagement, said gears being provided with a series of interlocking teeth for effective transmission of power in both directions of rotation, the teeth of one of said gears being of a thickness with respect to the teeth of the other gears so that full contact therebetween for driving rotative stresses in either direction is effected throughout only a portion of the peripheries of said gears whereby tendency for the interengageable gears to become disengaged by reason of torque transmitting stresses will be substantially eliminated.

14. In a power transmitting mechanism, in combination, a pair of aligned and slidable clutching elements arranged for interengagement and disengagement, each of said elements having a plurality of spaced projections arranged for effective transmission of power stresses in both directions of rotation, the shape of the projections presenting areas of contacting engagement establishing driving stresses throughout only a portion of the peripheries of said elements whereby tendency for the interengaging members to become disengaged by reason of torque transmitting stresses will be substantially eliminated.

15. In a power transmitting mechanism, in combination, a pair of aligned and slidable clutching elements arranged for interengagement and disengagement, each of said elements having a plurality of spaced projections arranged for effective transmission of power stresses in both directions of rotation, the shape and arrangement of the projections of one of said elements presenting areas of contacting engagement establishing driving stresses throughout only a portion of the peripheries of said elements whereby tendency for the interengaging members to become disengaged by reason of torque transmitting stresses will be substantially eliminated.

SAMUEL TRIMBATH.